SHIPPING CONTAINER

Filed Jan. 25, 1967

2 Sheets-Sheet 1

INVENTOR.
GERALD H. WILL
BY
Carpenter, Kinney & Coulter
ATTORNEYS

INVENTOR.
GERALD H. WILL
BY
Carpenter, Kinney & Coulter
ATTORNEYS 3,353,660
SHIPPING CONTAINER Gerald H. Will, Arnolds Park, Iowa, assignor to Minnesota Mining and Manufacturing Company, St. Paul, Minn., a corporation of Delaware Filed Jan. 25, 1967, Ser. No. 622,848
9 Claims. (Cl. 206—52)

ABSTRACT OF THE DISCLOSURE

This invention relates to improved shipping and storage containers for reels of tape, particularly reels of magnetic instrumentation or computer tape and video tape. The new containers include support means that permit stored reels to rotate within the container, and have been found to avoid previous kinds of damage to magnetic recording tape.

*Cross-reference to related application*

This application is a continuation-in-part of my earlier application, Ser. No. 480,970, filed Aug. 19, 1965 now abandoned.

*Background of the invention*

Instrumentation or video tape reels, which have rather large-diameter hub apertures, have been shipped in conventional shipping containers with the reel frictionally fit on aligned central hubs projecting from the sidewalls of the containers. The shipping containers shown in the U.S. patents to Alden, U.S. Pat. 3,154,193 and Burgess, U.S. Pat. 3,138,250 are examples of such prior art shipping containers for tape reels. Both of these patents show shipping containers that include annular flexible or rubber rings placed around inwardly-projecting circular hubs of the containers. The tape reels are frictionally fit over these rings, and the rings are intended to prevent the reels from rotating.

It has been found, however, that when a conventional container supporting a reel in this manner is moved and then suddenly stopped, as occurs when the container is subjected to vibration or jostling during transit, moments of force may arise on the tape wound on the reel. These forces whip the smooth-surfaced magnetic recording tape in a circumferential direction, tending to cause the tape to "cinch," or fold back on itself, at a point spaced radially from the hub. Eventually, the tape becomes distorted or creased, whereby it is made an inferior medium for recording.

*Summary of the invention*

It has now been found that tape can be substantially protected from the described damage by supporting the reel in the container with support means that substantially fix the reel against translatory movement, but which include low-friction means that permit the reel to rotate with respect to the container. This rotational freedom of the reel permits it to remain still or rotate only slightly when external forces on the container cause the latter to rotate. For example, when a shipping container of this invention is held in a person's hands, and given quick, short rotational movements about the axis of the container, the reel in the container rotates with respect to its original location very little or not at all. With the effect of the external forces on the reel and on the tape on the reel thus made less direct and sharp, it has been found that the tape is preserved from cinching damage.

A container of this invention, in general, includes a case assemblable from at least two sections. The case has two parallel, large-area sidewalls which are formed in most embodiments of the invention with aligned, central, inwardly-projecting, circular hubs. Annular, friction-reducing bearing means are mounted on the hub. These bearing means include a cylindrical portion adapted to fit within the hub aperture of a reel intended for shipment in the container and to support the reel. The bearing means further include low-friction means that permit rotation of the reel with respect to the case.

In a specific embodiment of the invention, the annular friction-reducing bearing means comprises an inexpensive, one-piece bearing ring made from a low-friction material that is slipped over the hub to provide the surface on which a reel in the container is seated.

*Description of the preferred embodiments*

Figure 1:
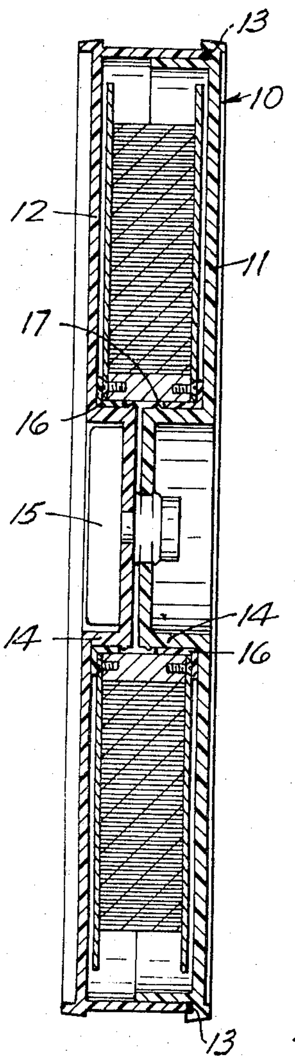
FIGURE 1 is a section along the diameter of a container of this invention with a reel in place in the container.
Figure 2:
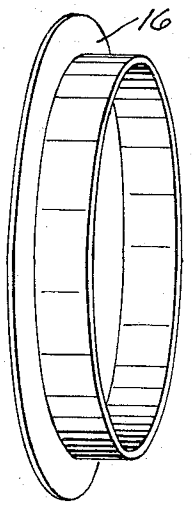
FIGURE 2 is a perspective drawing of a low-friction bearing ring which is part of the container shown in FIGURE 1.
Figure 4:
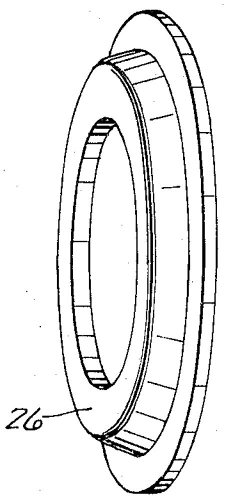
FIGURE 4 is a perspective view of a cup-shaped support ring which is a part of the container shown in FIGURE 3.

The embodiment of the invention shown in FIGURE 1 is an inexpensive, effective container intended for large volume use. The case 10 comprises two sections 11 and 12 each including a circular large-area sidewall with a short upstanding circumferential wall around the edge of the sidewall. The circumferential walls of the two sections overlap when the sections are assembled so that a closed case is formed, and a sealing ring 13 of soft rubber or other compressible material is placed around the outside of the circumferential wall of the section 11 for contact by the edge of the circumferential wall of the section 12. Inwardly-projecting circular hubs 14, formed centrally in each sidewall, are aligned and of a height such that they abut each other when the two sections are assembled. The sections are held together by a quarter-turn lock 15 that is mounted on one hub 14 and extends through the abutting portion of the other hub 14; the lock 15 includes a rubber ring that is expanded to grip the interior of an opening in the abutting portion of the other hub.

A low-friction bearing ring 16, comprising a short cylindrical portion and a flat annular radial flange, is fitted over each circular hub 14. (Though in the illustrated bearing ring the cylindrical portion is a true cylinder, useful bearing rings of the invention incorporate a cylindrical portion that is not circular in cross-section or that does not have completely vertical sidewalls.) The bearing ring 16 may fit either loosely or snugly on the hub and is typically held axially in place by an annular nib 17 located at the outer extremity of the cylindrical portion of the circular hub 14. The outer diameter of the cylindrical portion of the ring 16 should be slightly less, as about 5 mils less, than the inner diameter of the reel hub aperture, permitting sliding engagement of the reel on the bearing ring. Though it is less preferred, the bearing ring 16 may fit snugly within the reel hub aperture when the ring fits loosely on the circular hub. Typically the two sections 11 and 12 of the case are assembled and tightened together so that the distance between the facing flange surfaces of the two bearing rings 16 in the container is only slightly larger than the axial thickness of the reel in the container, thus limiting axial movement of the reel but leaving a sliding fit. A portion of the facing surface of the flange may be depressed to reduce the surface that contacts the reel.

At least the bearing surface of the bearing ring 16, that is, the outer surface of the cylindrical portion and the adjacent surface of the flange when the reel slides with respect to the bearing ring, should be hard, smooth, and of low-friction. Bearing rings of the invention are typically made from some hard, low-friction, and preferably long-wearing, and smooth-surfaced material, such as a synthetic polymeric material like Teflon (a polymer of tetrafluoroethylene and having static and dynamic coefficients of friction with anodized aluminum, a typical reel hub material, of 0.02–0.04), nylon, or Delrin, a thermoplastic resin that includes in its formula $$[(-OCH_2-)_n-]$$

Rings of these materials satisfactorily reduce the effect on contained reels of rotation forces on the shipping container. They may be used with typical reels, including reels with plastic hubs. Smooth-surfaced metal bearing rings, rings of a composite structure, or rings specially coated are also used.

Figure 3:
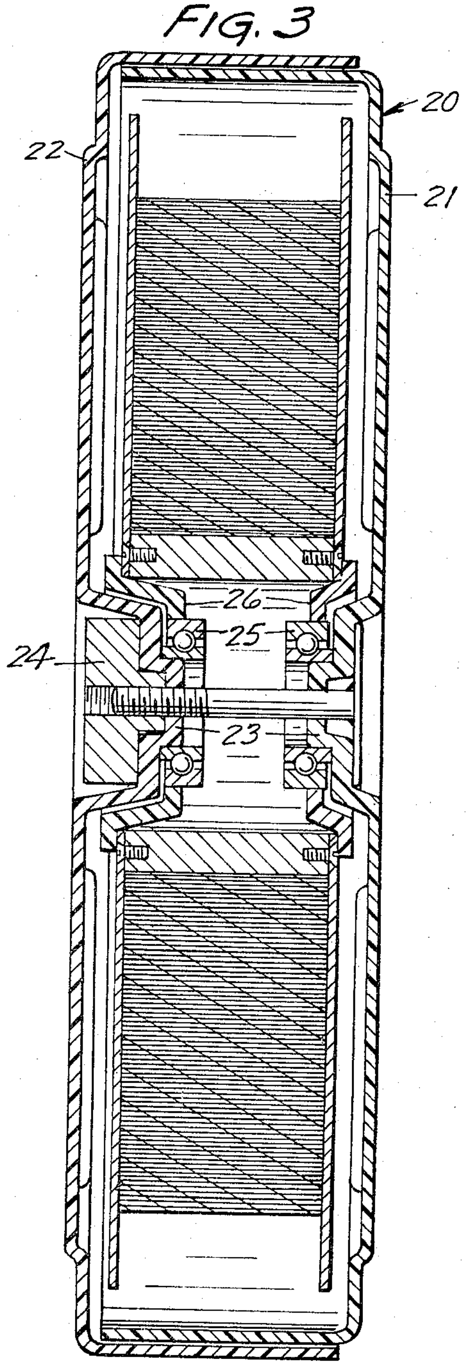
FIGURE 3 is a section along the diameter of a different container of this invention with a reel in place in the container.

In FIGURE 3 a more elaborate embodiment of the invention is shown which is intended principally for use with especially high quality, especially smooth-surfaced magnetic recording tape. The molded plastic case 20 comprises two sidewall sections 21 and 22 each formed with central inwardly-projecting circular hubs 23. The sections are held together by a bolt and nut combination 24. Low-friction bearings, such as ball or roller bearings, 25 are fixed over each circular hub and a cup-shaped support ring 26 is press-fitted around each bearing. The support ring 26 has a substantially cylindrical portion that fits within reel hub apertures to support the reels and, in addition, preferably is formed with a side flange that abuts the side of the reel. The support rings may be of different shape depending on the configuration of the case.

Figures 5, 6, 7:
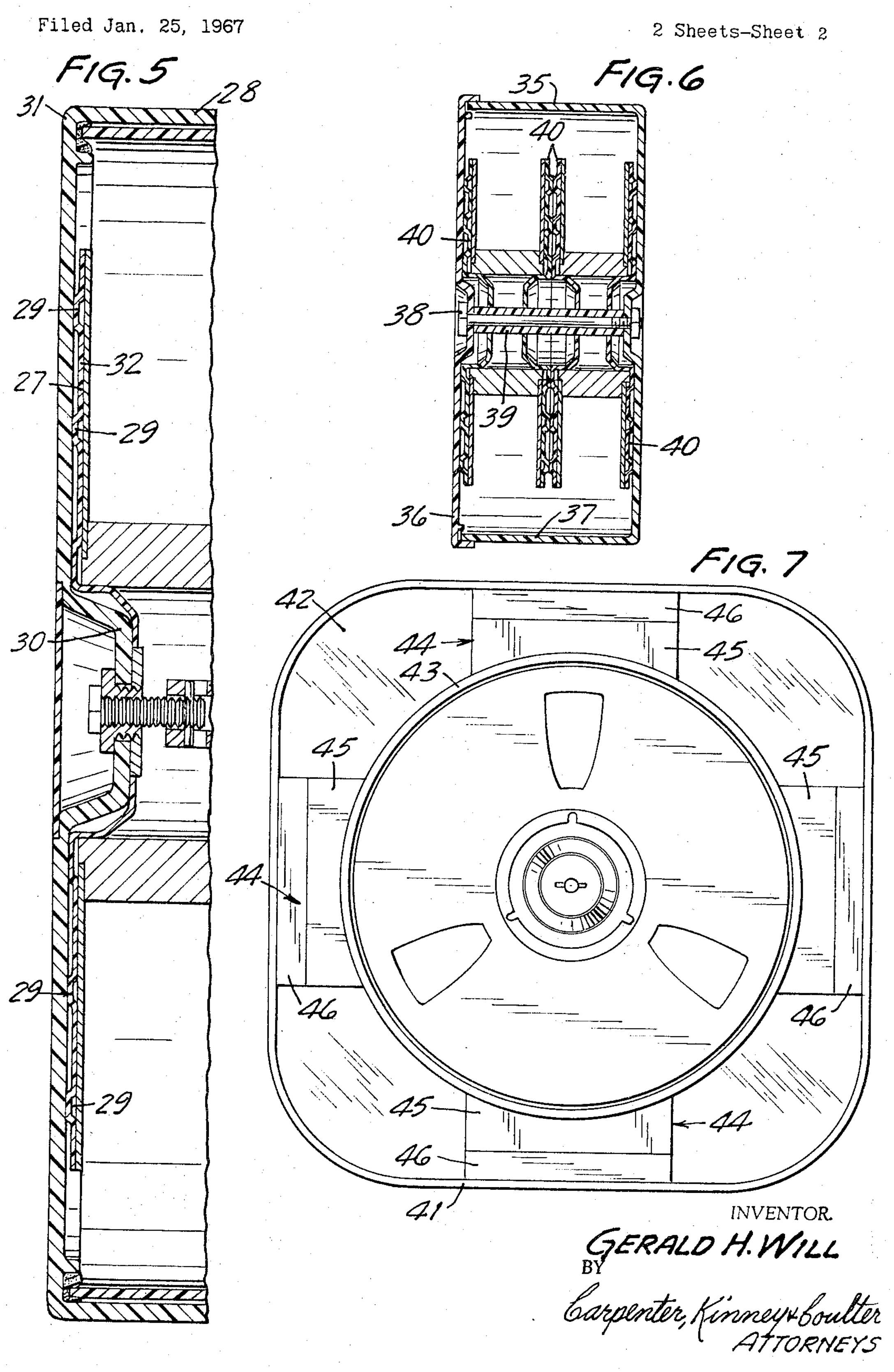
FIGURE 5 is a section along the diameter of a portion of a different container of this invention with a reel in place in the container.
FIGURE 6 is a section along the diameter of a multi-reel container of this invention with reels in place in the container.
FIGURE 7 is a plan view of one section of a different container of this invention with a reel in place in the container.

The bearing ring 27 of the container 28 illustrated in FIGURE 5 exhibits an additional feature in that it supports the flanges of reels shipped in the container against bending forces. As illustrated in the Alden and Burgess patents previously mentioned, reels have conventionally been set on rubber rings having a short annular side flange. However, axial components of the quite severe impacts that shipping containers sometimes experience have been found to bend standard video tape reels in conventional shipping containers. The bearing ring 27 includes a cylindrical portion and a flat radial flange that has a diameter approximately equal to the diameter of reels intended for shipment in the container. Annular bosses 29 are formed in the flange making the thickness of the flange in the areas of the bosses sufficient to fill the space between the sidewall of the container and the reel flange, and, it has been found, to support the reel flange against the described bending forces.

The bearing ring 27 is mounted over a central, inwardly-projecting, circular hub 30 of section 31 of the container 28 (the nonillustrated section of the container also has a hub over which a generally similar bearing ring 27 is placed). The bearing ring 27 typically fits loosely over the hub 30 of container section 31 and loosely within the reel hub aperture. It is conveniently formed from a synthetic polymeric material such as Cycolak, a high-impact, styrene-type, rigid thermoplastic resin. The bearing surface 32 of the ring 27 that contacts the sidewall of the container is preferably coated with a silicone or like coating agent to reduce friction. The spaced annular bosses 29 formed in the flange 31 substantially reduce the areas of the bearing surface 32 of the bearing ring 27 that contact the sidewall of the container section 30, and through the bearing ring supports the reel flange, it has been found that the bearing ring readily rotates with respect to the container.

As shown in FIGURE 6, containers of the invention may hold more than one reel. The container 35 comprises two sections 36 and 37 held together by a bolt and nut combination 38. A shaft 39 through which the bolt passes extends between the two sections 36 and 37 to provide a hub for bearing rings 40, which are similar to the bearing ring illustrated in FIGURE 5.

FIGURE 7 shows the base 41 of a container 42 of the invention that has a different kind of support means for the reel to be shipped. Instead of incorporating a hub to support rotation of the reel, the reel is placed inside an inner cylindrical reel box 43 (only the base being illustrated) having at least a low-friction outer circumferential surface. The box 43 is held between four supports 44 which include a shoe 45 and a resilient cushion 46 of rubbery or cushionable material. At least the contact surface of the shoe is low in friction, so that the reel box 42 readily rotates within the container. The resilient cushion permits slight movement of the reel box 42, and the reel can move somewhat within the box 42; but the reel is substantially fixed against translatory movement within the container.

I claim:

1. A transportation and storage container and at least one tape reel therein carrying magnetic recording tape, said container comprising an assemblable case and support means within the case for mounting said reel, said support means including (1) structure substantially fixing said reel against translatory motion within the container, and (2) low-friction means whereby said reel rotates with respect to the container, thereby permitting the reel to remain partially independent of rotary forces on the container.

2. A transportation and storage container adapted to hold and rotatively mount at least one predetermined tape reel comprising an assemblable case having two parallel large-area sidewalls, a circular hub projecting inwardly from at least one sidewall, and annular friction-reducing bearing means mounted on said hub, said bearing means (1) having a cylindrical outer surface adapted to fit within the hub aperture of said predetermined reel and support the reel, and (2) including low-friction means whereby said reel rotates with respect to the container, thereby permitting the reel to remain partially independent of rotary forces on the container.

3. The container of claim 2 in which the bearing means comprises an annular bearing ring mounted over the circular hub and having a low-friction bearing surface.

4. The container of claim 2 in which the bearing means comprises an annular bearing ring mounted over the circular hub and including a cylindrical portion and a flat annular side flange, said bearing ring having a low-friction bearing surface.

5. The container of claim 2 in which the bearing means comprises an annular bearing ring mounted over the circular hub and made from a low-friction synthetic polymeric material, the ring including a cylindrical portion and a flat annular side flange.

6. The container of claim 2 in which the bearing means comprises an annular bearing ring mounted over the circular hub and including a cylindrical portion and a generally flat annular side flange having a diameter substantially equal to that of said reel, said bearing ring having a low-friction bearing surface.

7. The container of claim 6 in which the annular side flange includes at least one annular boss which provides a small area of contact in the bearing surface.

8. The container of claim 2 in which the bearing means comprises a ball bearing and an annular support ring mounted on the revolving part of the bearing, said support ring having an outer cylindrical surface adapted to snugly fit within the hub aperture of said predetermined reel.

9. A transportation and storage container and at least one tape reel therein carrying magnetic recording tape, said container comprising an assemblable case having two parallel large-area sidewalls formed with aligned central inwardly-projecting circular hubs, and annular friction-reducing bearing means mounted on the hubs, said bearing means (1) having a cylindrical outer surface fitting within the hub aperture of said reel and supporting the reel, and (2) including low-friction means whereby said reel rotates with respect to the container, thereby permitting the reel to remain partially independent of rotary forces on the container.

References Cited

UNITED STATES PATENTS

| | | | |
|---|---|---|---|
| 2,624,527 | 1/1953 | Von Kohorn | 242—155 |
| 3,074,546 | 1/1963 | Burgess et al. | 206—52 |
| 3,138,250 | 6/1964 | Burgess et al. | 206—52 |
| 3,154,193 | 10/1964 | Alden | 206—52 |
| 3,208,585 | 9/1965 | Hultgren et al. | 206—52 |

THERON E. CONDON, *Primary Examiner.*

W. T. DIXSON, *Assistant Examiner.*